(12) United States Patent
Luna et al.

(10) Patent No.: US 10,049,110 B2
(45) Date of Patent: Aug. 14, 2018

(54) CONTENT RANKING BASED ON PERSON-TO-PERSON SHARING

(71) Applicant: Lenovo (Singapore) Pte. Ltd., Singapore (SG)

(72) Inventors: Joaquin F. Luna, Durham, NC (US); Rod D. Waltermann, Rougemont, NC (US); Bradley P. Strazisar, Cary, NC (US); Timothy W. Kingsbury, Cary, NC (US); Vikram Sharma, Morrisville, NC (US); Kushagra Jindal, Cary, NC (US); Dipeshkumar N. Hada, Morrisville, NC (US)

(73) Assignee: Lenova (Singapore) Pte. Ltd., Singapore (SG)

( * ) Notice: Subject to any disclaimer, the term of this patent is extended or adjusted under 35 U.S.C. 154(b) by 307 days.

(21) Appl. No.: 14/851,936

(22) Filed: Sep. 11, 2015

(65) Prior Publication Data
US 2017/0075890 A1    Mar. 16, 2017

(51) Int. Cl.
G06F 17/30    (2006.01)
H04L 29/08    (2006.01)

(52) U.S. Cl.
CPC .... G06F 17/30035 (2013.01); G06F 17/3005 (2013.01); G06F 17/30867 (2013.01); H04L 67/22 (2013.01); H04L 67/36 (2013.01)

(58) Field of Classification Search
CPC .................................................. G06F 17/241
See application file for complete search history.

(56) References Cited

U.S. PATENT DOCUMENTS

| | | | | |
|---|---|---|---|---|
| 2012/0114302 | A1* | 5/2012 | Randall | G11B 27/105 386/241 |
| 2013/0124539 | A1* | 5/2013 | Lin | G06Q 50/01 707/749 |
| 2014/0344017 | A1* | 11/2014 | Deephanphongs | H04N 21/25866 705/7.29 |
| 2014/0351346 | A1* | 11/2014 | Barton | H04L 51/00 709/206 |
| 2015/0139610 | A1* | 5/2015 | Syed | G11B 27/34 386/241 |
| 2015/0209677 | A1* | 7/2015 | O'Brien | A63F 13/792 463/25 |

* cited by examiner

*Primary Examiner* — Hung Q Pham
(74) *Attorney, Agent, or Firm* — VanLeeuwen & VanLeeuwen; Carlos Munez-Bustamante (57) ABSTRACT

An approach is provided for identifying favorite multimedia content, such as digital photographs, possessed by a user. The approach detects a number of content sharing actions involving multimedia content, such as digital photographs, with the detecting being from a number of content handling applications, such as social media sites and person-to-person sharing. One of the content handling applications is a content player, such as a image viewer, that runs on a portable device, such as a smart phone or tablet computer system. The approach computes a shared content score for each of the multimedia content, with the shared content score being based on the content handling application that was used in the content sharing actions. The approach further identifies "favorite" multimedia content based on the shared content score pertaining to each multimedia content.

17 Claims, 5 Drawing Sheets

CONTENT RANKING BASED ON PERSON-TO-PERSON SHARING

BACKGROUND

When taking pictures and videos, users are often more emotionally or sentimentally attached to a specific few pictures or videos. Sorting out favorites from the many content recordings that fill a user's smart phone, hard drives, and online accounts is tedious. Such a search can cause the best content to become lost or forgotten. Third-party apps exist for calculating metrics for users to keep track of popular media that have been reposted, but these apps are tied to a specific website and not the shared media itself. Ranking media is another approach, however ranking is generally performed manually by the user. To rank content, either the sharing user decides which photos to post, keep, or delete, or other users rate the media with a star-based metric which is captured by a third-party. There is currently no method to automatically rank media based on multiple factors that would make it more meaningful to the sharing user.

SUMMARY

An approach is provided for identifying favorite multimedia content, such as digital photographs, possessed by a user. The approach detects a number of content sharing actions involving multimedia content, such as digital photographs, with the detecting being from a number of content handling applications, such as social media sites and person-to-person sharing. One of the content handling applications is a content player, such as a image viewer, that runs on a portable device, such as a smart phone or tablet computer system. The approach computes a shared content score for each of the multimedia content, with the shared content score being based on the content handling application that was used in the content sharing actions. The approach further identifies "favorite" multimedia content based on the shared content score pertaining to each multimedia content.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

FIGS. 1-5 show an approach that This invention helps by tagging content such as photos and videos that are a user's "favorites" by tracking how the multimedia content is shares. A photo that is particularly funny, cute, or interesting in some way is much more likely to be shared. Sharing can be in the form of opening the photo on your phone or camera and passing it to a friend. In addition, sharing can be done over email and text message. Additionally, sharing can include posting files to social media web sites. Much of the multimedia content, such as photos, taken today are taken on smart phones or tablet devices that include a front facing camera. When a photo is opened on a device, the approach uses the front facing camera and facial recognition technology to detect when a photo is being viewed by a person other than the phone's owner. Often a phone is passed to several people at a time when this happens. The approach tracks the number of times a file is texted or emailed. Similarly, the approach tracks which and how often content is posted to social media web sites.

Sharing of content may also include sending photos to online printing services. An alternate embodiment of detecting sharing could use a combination of the devices available on the smart device, such as an accelerometer and a microphone, to detect others viewing the image. The accelerometer can detect the motion of the device being passed and the lack of motion while the image is being viewed. A microphone can detect comments from other viewers while content is being played on the device. Each time content is shared, a field in the metadata of the file is incremented. In one embodiment, there is a field for each type of sharing. For instance, a separate count can be maintained for person-to-person sharing, versus how many times a file was attached to an email. In one embodiment, a ranking is computed by assigning a weight to the count for each sharing method and combining the weighted totals of all sharing methods. When browsing through the digital content after having sharing detected and tracked, identifying a user's favorite multimedia content becomes a relatively simple matter of sorting them by their sharing rank.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
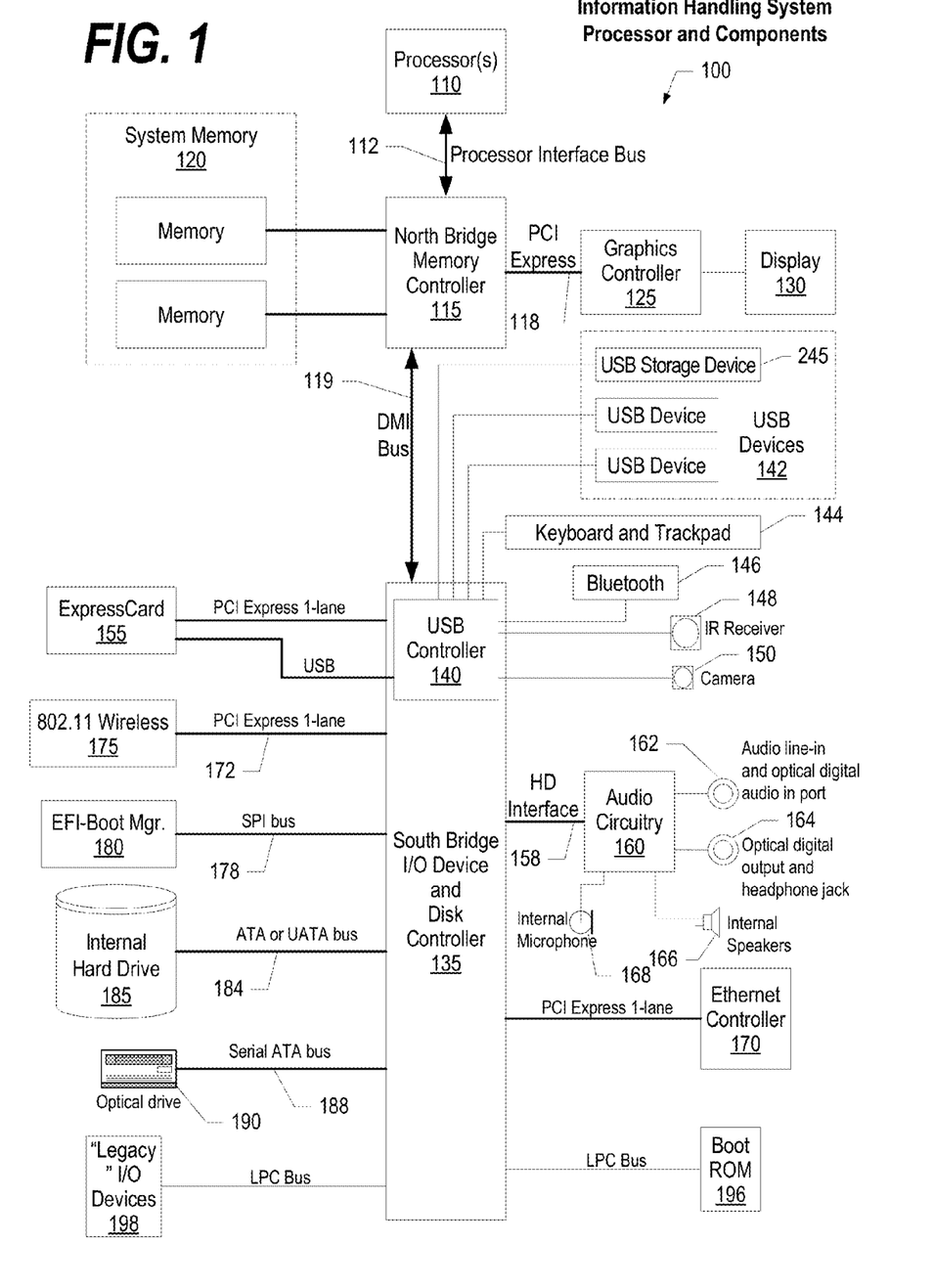
FIG. 1 is a block diagram of a data processing system in which the methods described herein can be implemented.
Figure 2:
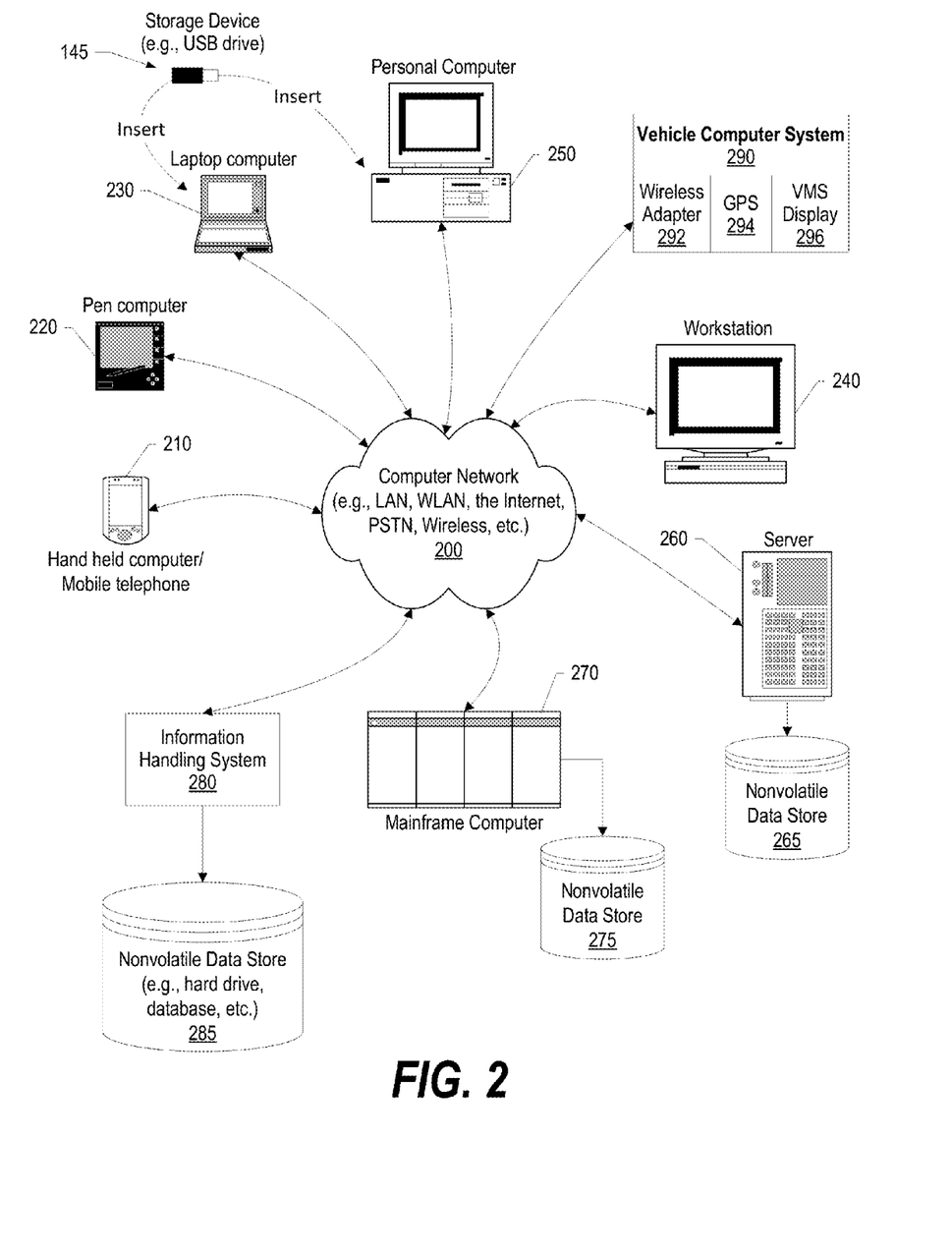
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
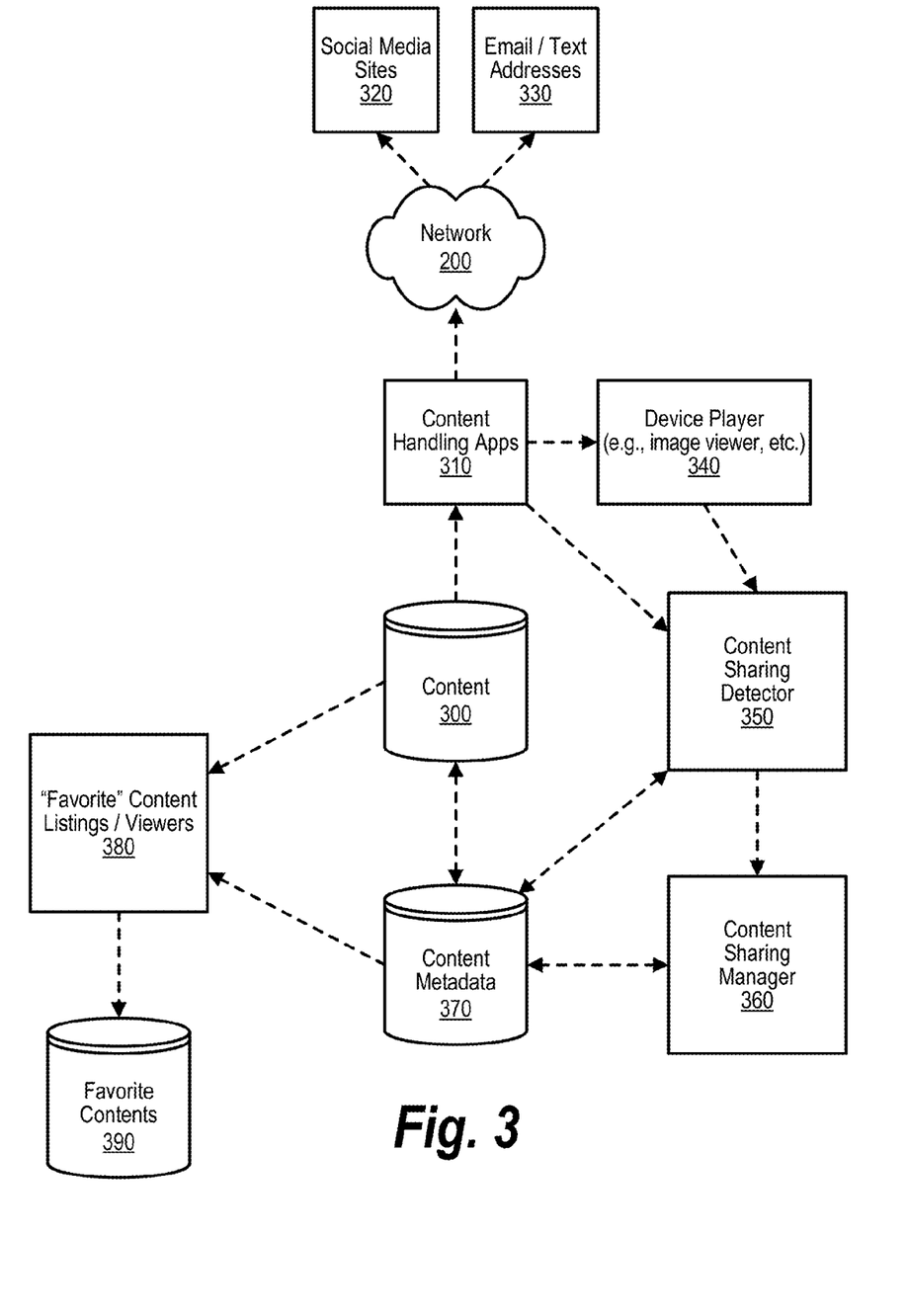
FIG. 3 is a diagram depicting components that interact to provide content ranking based on person-to-person sharing.

FIG. 3 is a diagram depicting components that interact to provide content ranking based on person-to-person sharing. Content data store 300 is a data store of a user's multimedia content such as digital photographs, digital videos, digital audio recordings, and the like.

Content Handling Applications 310 can be a variety of applications that enable the user to share contents with other users. Some sharing activity may be performed via computer network 200, such as the Internet. Network-based sharing activities may utilize social media websites 320, and email or text messaging services 330 that transmit content to a particular address or set of addresses. Other web-based sharing activities can also be detected, such as sharing on other types of web sites.

In one embodiment, a "hook" is installed on the user's devices, such as smart phones, computer systems, tablet systems, and the like, that aid in detecting when multimedia content is shared with other users. The hook triggers content sharing detector 350 that detects the sharing of multimedia content as well as the type of sharing that is being performed (e.g., shared via a social media site, shared via an email or text message, etc.). In addition, a hook is included in device players 340 that execute from the user's device, such as from the user's smart phone.

Device player 340 might be an image viewer for digital photographs, a video player for digital videos, and an audio player for digital audio recordings. When a device player is used to play multimedia content, content sharing detector 350 is notified and performs actions to identify the person to whom the content is being played as well as whether the content is played to several people either at the same time or serially (e.g., by passing the device from one person to another, etc.).

Content sharing detector 350 further notifies content sharing manager 360 that keeps track of various records regarding the multimedia content and metadata pertaining to the content which is shown as data store 370. By keeping track of sharing activities pertaining to multimedia content, multimedia content listings and viewers 380 can identify the user's favorite multimedia content based on a shared content score that is computed based on the sharing actions performed on any number of multimedia content handling applications (e.g., social media sites, email/text messages, device-based multimedia players, etc.). The user's favorite multimedia content can then be stored in data store 390 for easier selection and retrieval.

In one embodiment, when a device player is used, the system detects the playing of a selected multimedia content to a user of a portable device by utilizing one or more sensors included in the portable device. The sensors might include a digital camera that captures the image of the person that is viewing the multimedia content, a microphone on the device that detects users handling the device and making comments regarding the content, and an accelerometer the detects when the device is picked up or passed from one user to another. The content sharing manager increments a play count corresponding to the selected multimedia content, and the shared content score is further based on the play count.

In a further embodiment, the system not only captures a facial image of the users of the portable device, but further identifies the users based on the captured facial images using facial recognition technology. This embodiment further determines whether the playing of the selected multimedia content is a repeat playing to a given user or if the user is receiving the content for the first time. In this further embodiment, the incrementing of the play count is altered based on whether the playing is a repeat performance to the user or a first time play to the user. In yet a further embodiment, if the system is unable to identify a user based on the captured facial images, then an anonymous user play count is incremented.

In one embodiment, a number of weighting factors are used with each of the weighting factors corresponding to one of the plurality of content handling applications with the shared content score being based on the weighting factors. In this manner, for example, sharing that is performed in a more personal manner, such as face to face using the device to play the multimedia content or sent in a text or email message can be weighted more heavily than less personal sharing, such as sharing on social media sites. In a further embodiment, the system can track the number of shares of each multimedia content by different people and adjust the play count based on the number of plays of the multimedia content to the different people and based on a number of views of the multimedia content by various people.

Figure 4:
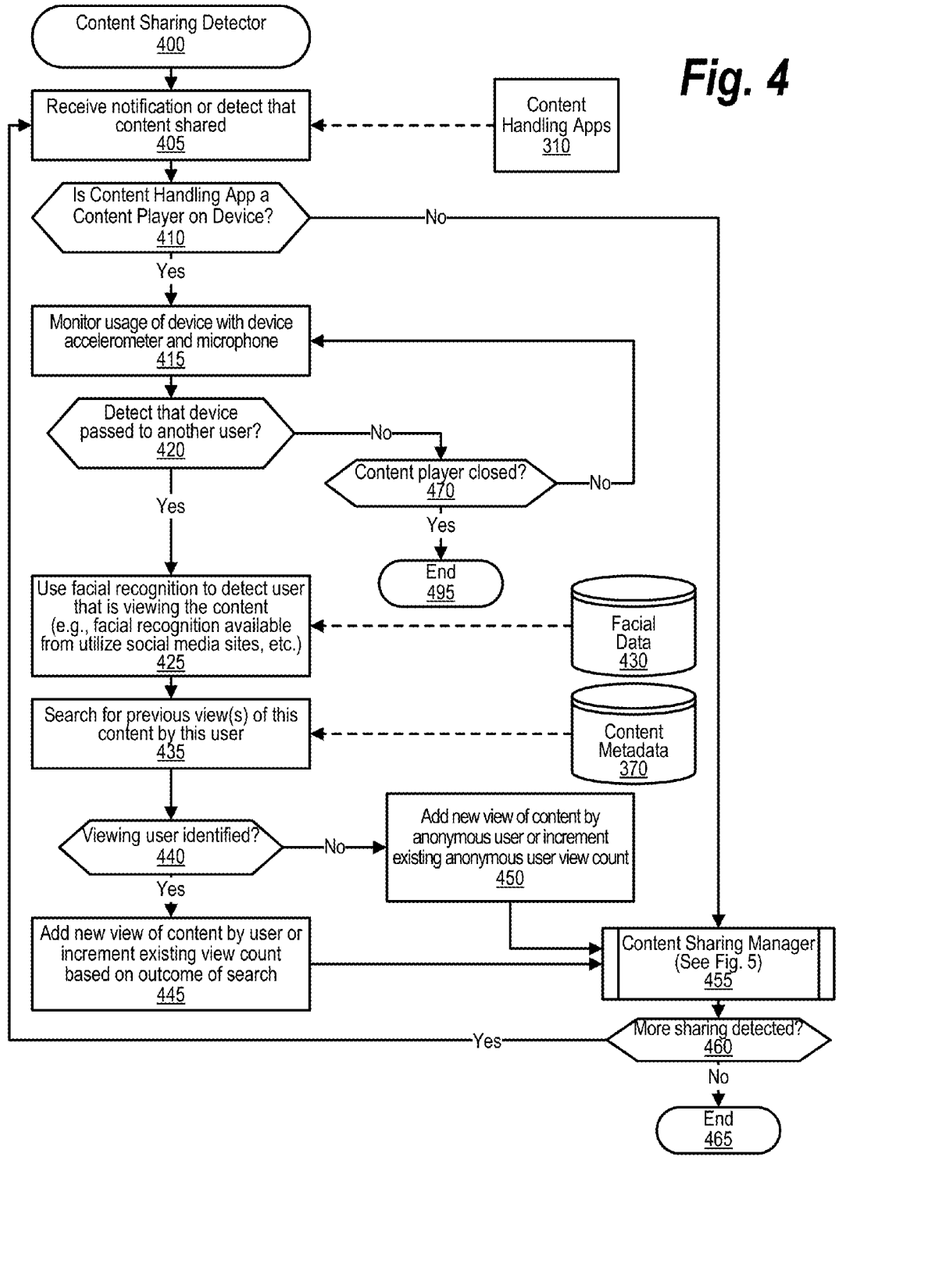
FIG. 4 is a flowchart showing steps taken by a content sharing detector component running on one or more devices.

FIG. 4 is a flowchart showing steps taken by a content sharing detector component running on one or more devices. FIG. 4 processing commences at 400 and shows the steps taken by a Content Sharing Detector process. At step 405, the process receives a notification from content handling application 310 or otherwise detects that multimedia content is being shared by the user.

The process determines as to whether the sharing is being performed by a Content Player, such as an image viewer, a video player, or an audio player, installed on the user's device (decision 410). If the sharing is being performed by a Content Player, then decision 410 branches to the 'yes' branch to perform steps 415 through 450 that further detect and manage sharing at the device. On the other hand, if the sharing is being performed by a Content Player, and is instead being shared via social media, text or email message, or the like, then decision 410 branches to the 'no' branch bypassing steps 415 to 450.

If the sharing is being performed by a Content Player then, at step 415, the process monitors the usage of device by using device sensors such as the device's accelerometer and microphone. Based on the sensor data, the process determines whether the device was passed to another user (decision 420). If the device was passed to another user, then decision 420 branches to the 'yes' branch to perform steps to identify the user of the device and increment counters accordingly. On the other hand, if the device was not passed to another user, then decision 420 branches to the 'no' branch whereupon the process determines as to whether the content player has been closed (decision 470). If the content player has not yet been closed, then decision 470 branches to the 'no' branch which loops back to step 415 to continue monitoring the device by utilizing the device's sensors. This looping continues until the content player has been closed, at which point decision 470 branches to the 'yes' branch exiting the loop and processing ends at 495.

Returning to decision 420, if the device has been passed to another user then, at step 425, the process uses facial recognition to detect the user that is currently viewing the content (e.g., facial recognition available from utilize social media sites, etc.). The process uses the device's digital camera to detect the facial image of the current user of the device and compares the facial image to known facial images that are retrieved from data store 430. If the current user is identified, then, at step 435, the process searches content metadata 370 for previous view(s) of this content by the current user.

The process determines as to whether the process was able to identify the current user that is playing the content (decision 440). If the current user was successfully identified, then decision 440 branches to the 'yes' branch whereupon, at step 445, the process adds a new play of the content by the current user or increments the current existing view count based on the outcome of the search performed at step 435. On the other hand, if the process was unable to identify the current user, then decision 440 branches to the 'no' branch whereupon, at step 450 the process adds a new view of the content by an anonymous user or increments an existing anonymous user view count if this is the first play of the content to an anonymous user.

Figure 5:
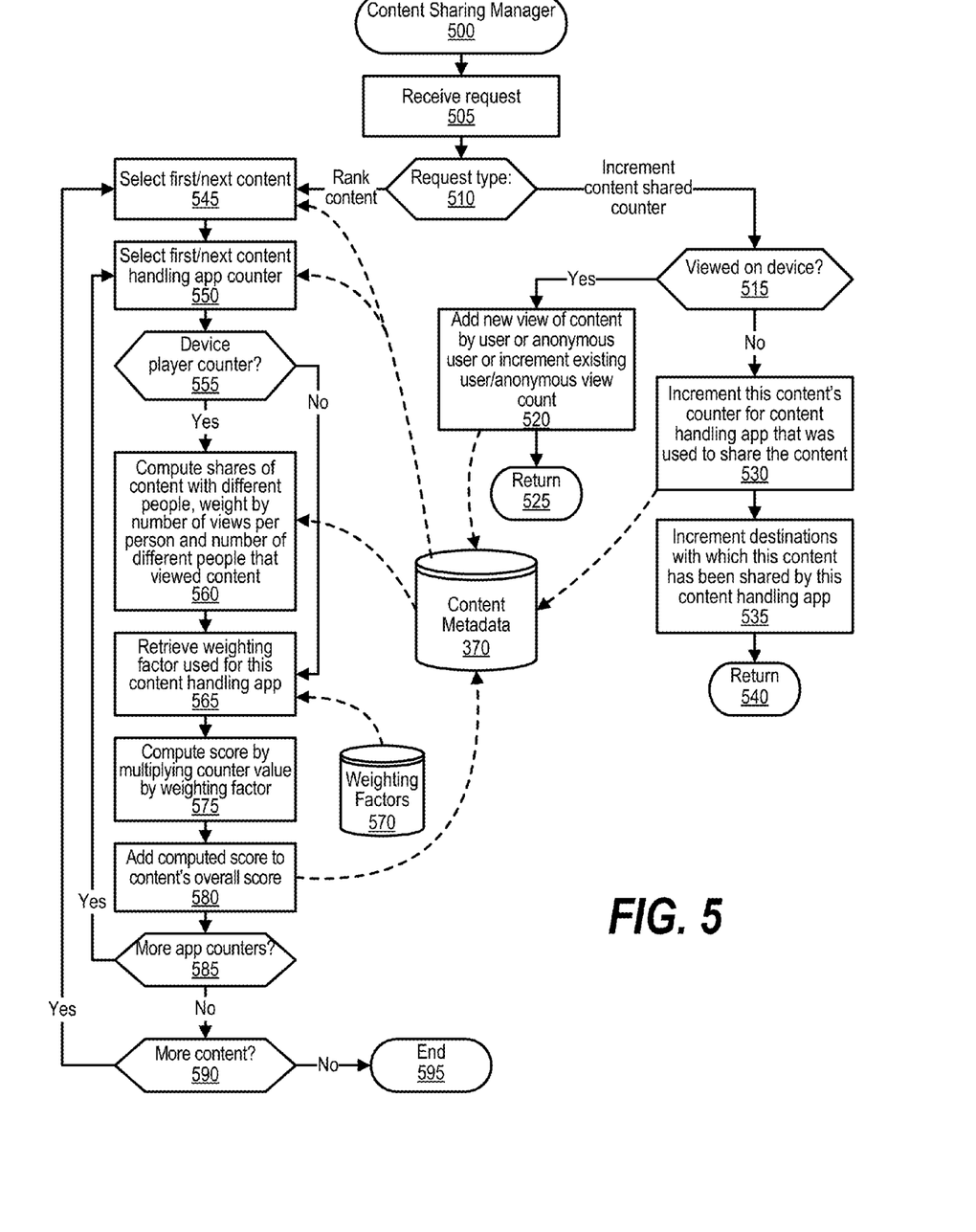
FIG. 5 is a flowchart showing further steps taken by a content sharing manager that tracks person-to-person sharing of content.

At predefined process 455, the process performs the Content Sharing Manager routine (see FIG. 5 and corresponding text for processing details). The process determines as to whether more sharing of the content is detected (decision 460). If more sharing of the content is detected, then decision 460 branches to the 'yes' branch which loops back to step 405 to receive the next sharing notification from a content handling application. This looping continues until no more sharing of the content is detected, at which point decision 460 branches to the 'no' branch exiting the loop and processing ends at 465.

FIG. 5 is a flowchart showing further steps taken by a content sharing manager that tracks person-to-person sharing of content. FIG. 5 processing commences at 500 and shows the steps taken by the Content Sharing Manager process. At step 505, the process receives a request from the user or from the Content Sharing Detector shown in FIG. 4. The process determines as to whether request type is to rank content for the user or to increment sharing counters because of a content sharing detection (decision 510). If the request type is to increment counters because of a content sharing detection, then decision 510 branches to the right branch to increment counters using steps 515 through 540. On the other hand, if the request type is to rank content, then decision 510 branches to the left branch to rank content for a user so that the user can more easily identify the user's favorite multimedia content.

If the request type is to increment counters, then the process executes steps 515 through 540 as described below. The process first determines as to whether the content was played on a device player (decision 515). If the content was played on a device player, then decision 515 branches to the 'yes' branch whereupon at step 520, the process adds the new play of the content by an identified user or by an anonymous user or increments an existing user or an existing anonymous view count and this addition is reflected in content metadata data store 370. FIG. 5 processing thereafter returns to the calling routine (see FIG. 4) at 525.

On the other hand, if the sharing was not a sharing by playing the content on the device, then decision 515 branches to the 'no' branch whereupon at step 530, the process increments this content's counter corresponding to the content handling application (e.g., social media site, email/text message, etc.) that was used to share the content and this incrementing is reflected in content metadata data store 370. At step 535, the process increments the destinations with which this content has been shared by this content handling application. FIG. 5 processing thereafter returns to the calling routine (see FIG. 4) at 540.

Returning to decision 510, if the request type is to rank the user's multimedia content, then steps 545 through 595 are performed as described below. At step 545, the process selects the first content from content multimedia data store 370. At step 550, the process selects the first content handling application counter from the data maintained for this content in multimedia data store 370.

The process determines as to whether the counter is a device player counter, such as a counter used to track shares of content in an image viewer, video player, or audio player (decision 555). If the selected counter is a device player counter, then decision 555 branches to the 'yes' branch whereupon at step 560, the process computes the shares of the selected content with different people, weights the counts by the number of views per person and the number of different people that viewed the selected content. On the other hand, if the selected counter is not a device player counter, then decision 555 branches to the 'no' branch bypassing step 560.

At step 565, the process retrieves the weighting factor that is used for this content handling application. in one embodiment, applications that are more personal, such as a device player, email, or a text message, are weighted more heavily than other applications. The weighting factors are retrieved from weighting factors data store 570. At step 575, the process computes a shared content score by multiplying the counter value by the weighting factor. At step 580, the process adds the computed score to selected content's overall content score.

The process determines as to whether there are more application counters to process (decision 585). If there are more application counters to process, then decision 585 branches to the 'yes' branch which loops back to step 550 to select and process the next application counter as described above. This looping continues until there are no more application counters to process, at which point decision 585 branches to the 'no' branch exiting the loop.

The process next determines as to whether there are more multimedia content entries in content metadata 370 to process (decision 590). If there are more multimedia content entries to process, then decision 590 branches to the 'yes' branch which loops back to step 545 to select and process the next multimedia content as described above. This looping continues until there are no more multimedia content entries to process, at which point decision 590 branches to the 'no' branch exiting the loop and processing ends at 595.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method comprising:
   detecting, using one or more processors, a plurality of content sharing actions corresponding to one or more selected multimedia content, wherein the detection is from a plurality of content handling applications, and wherein at least one of the plurality of content handling applications is a content player on a portable device that is passed from a first user to one or more second users, wherein the detecting further distinguishes between the second users by capturing digital images of the second users;
   computing, using one or more processors, a shared content score corresponding to each of the one or more selected multimedia content, wherein the shared content score is based on the plurality of content handling applications used in the plurality of content sharing actions and wherein the shared content score is further based on a number of the second users that shared the portable device;

retrieving, using one or more processors, one or more favorite multimedia contents from the one or more selected multimedia contents based on the shared content score pertaining to the one or more of the selected multimedia content; and displaying the one or more favorite multimedia contents on a display.

2. The method of claim 1 wherein at least one of the content handling applications is selected from the group consisting of an email application, a text message application, a social media website, and a content publishing service.

3. The method of claim 1 further comprising:

detecting the passing of the portable device from the first user to a the second users by utilizing the one or more sensors included in the portable device; and further incrementing the play count corresponding to the selected one of the multimedia content based on the playing of the selected one of the multimedia content to the second user.

4. The method of claim 1 further comprising:

retrieving a plurality of weighting factors, wherein each of the weighting factors correspond to one of the plurality of content handling applications, wherein the shared content score is further based on the weighting factors.

5. The method of claim 4 wherein the plurality of weighting factors is stored as metadata associated with the one or more selected multimedia content.

6. The method of claim 4 further comprising:

tracking a number of shares of each of the one or more selected multimedia content by a plurality of different people and adjusting the play count based on a number of plays of the one or more selected multimedia content by the plurality of different people and on a number of views of the one or more selected multimedia content by the plurality of different people.

7. An information handling system comprising:

one or more processors;

a memory coupled to at least one of the processors;

a display accessible by at least one of the processors; and a set of instructions stored in the memory and executed by at least one of the processors to:

detect a plurality of content sharing actions corresponding to one or more selected multimedia content, wherein the detection is from a plurality of content handling applications, and wherein at least one of the plurality of content handling applications is a content player on a portable device that is passed from a first user to one or more second users, wherein the detection further distinguishes between the second users by capturing digital images of the second users;

compute a shared content score corresponding to each of the one or more selected multimedia content, wherein the shared content score is based on the plurality of content handling applications used in the plurality of content sharing actions and wherein the shared content score is further based on a number of the second users that shared the portable device;

retrieve one or more favorite multimedia contents from the one or more selected multimedia contents based on the shared content score pertaining to the one or more of the selected multimedia content; and display the one or more favorite multimedia contents on a display.

8. The information handling system of claim 7 wherein at least one of the content handling applications is selected from the group consisting of an email application, a text message application, a social media website, and a content publishing service.

9. The information handling system of claim 7 wherein the instructions are further executed by the processors to perform actions comprising:

detect the passing of the portable device from the first user to the second users by utilizing the one or more sensors included in the portable device; and further increment the play count corresponding to the selected one of the multimedia content based on the playing of the selected one of the multimedia content to the second user.

10. The information handling system of claim 7 wherein the instructions are further executed by the processors to perform actions comprising:

retrieving a plurality of weighting factors, wherein each of the weighting factors correspond to one of the plurality of content handling applications, wherein the shared content score is further based on the weighting factors.

11. The information handling system of claim 10 wherein the plurality of weighting factors is stored as metadata associated with the one or more selected multimedia content.

12. The information handling system of claim 10 wherein the instructions are further executed by the processors to perform actions comprising:

tracking a number of shares of each of the one or more selected multimedia content by a plurality of different people and adjusting the play count based on a number of plays of the one or more selected multimedia content by the plurality of different people and on a number of views of the one or more selected multimedia content by the plurality of different people.

13. A computer program product comprising:

a computer readable storage medium comprising a set of computer instructions, the computer instructions effective to:

detect a plurality of content sharing actions corresponding to one or more selected multimedia content, wherein wherein the detection is from a plurality of content handling applications, and wherein at least one of the plurality of content handling applications is a content player on a portable device that is passed from a first user to one or more second users, wherein the detection further distinguishes between the second users by capturing digital images of the second users;

compute a shared content score corresponding to each of the one or more selected multimedia content, wherein the shared content score is based on the plurality of content handling applications used in the plurality of content sharing actions and wherein the shared content score is further based on a number of the second users that shared the portable device;

retrieve one or more favorite multimedia contents from the one or more selected multimedia contents based on the shared content score pertaining to the one or more of the selected multimedia content; and display the one or more favorite multimedia contents on a display.

14. The computer program product of claim 13 wherein at least one of the content handling applications is selected from the group consisting of an email application, a text message application, a social media website, and a content publishing service.

15. The computer program product of claim 13 wherein the set of instructions comprise additional instructions effective to:
- detect the passing of the portable device from the first user to the second users by utilizing the one or more sensors included in the portable device; and
- further increment the play count corresponding to the selected one of the multimedia content based on the playing of the selected one of the multimedia content to the second user.

16. The computer program product of claim 13 wherein the set of instructions comprise additional instructions effective to:
- retrieve a plurality of weighting factors, wherein each of the weighting factors correspond to one of the plurality of content handling applications, wherein the shared content score is further based on the weighting factors; and
- track a number of shares of each of the one or more selected multimedia content by a plurality of different people and adjust the play count based on a number of plays of the one or more selected multimedia content by the plurality of different people and on a number of views of the one or more selected multimedia content by the plurality of different people.

17. The computer program product of claim 16 wherein the plurality of weighting factors is stored as metadata associated with the one or more selected multimedia content.

* * * * *